Patented May 4, 1943

2,318,556

UNITED STATES PATENT OFFICE 2,318,556

SULPHANILAMIDE DERIVATIVES

Winfrid Hentrich, Rodleben, near Dessau-Rosslau, and Alfred Kirstahler and Wilhelm Kaiser, Dessau, Germany; assignors, by mesne assignments, to The Hydronaphthene Corporation, Wilmington, Del., a corporation of Delaware No Drawing. Application May 31, 1940, Serial No. 338,220. In Germany June 1, 1939

5 Claims. (Cl. 260—397.7)

In accordance with this invention it has been found that valuable derivatives from sulphonamides of the general formula

$$NH_2.R—SO_2.NH—R'—SO_2—R''$$

wherein R is a substituted or unsubstituted aromatic, heterocyclic or mixed aromatic-heterocyclic organic substituent, R' a substituted or unsubstituted hydrocarbon radical, and R'' a substituted or unsubstituted and preferably aliphatic organic substituent, are obtainable by reacting either aromatic, heterocyclic or mixed aromatic-heterocyclic sulphonic acids or their reactive sulphonic acid-derivatives containing preferably in the p-position at least one substituted or unsubstituted amino-group or one group convertible into an amino group with amino-substituted sulphones of the general formula $NH_2.R'.SO_2.R''$. In accordance with another embodiment of the invention aromatic, heterocyclic or mixed aromatic-heterocyclic sulphamides or their alkali-metal-compounds containing preferably in p-position at least one stustituted or unsubstituted amino-group, or one group convertible into an amino-group, are reacted with sulphones of the general formula $Hal.R'.SO_2—R''$ which contain exchangeable halogen atoms. Subsequently the nitrogen substituted group may be changed to an amino group if necessary.

As initial materials for the present process besides the sulphonic acids themselves, sulphonic acid anhydrides, sulphonic acid esters, sulphonic acid halides particularly sulphonic acid chlorides, sulphonic acid amides or their metal compounds respectively may be used. Such compounds may be derived for example, from the following sulphonic acids: 4-aminobenzene sulphonic acid or its nuclear substitution products e. g. 4-amino-5-methyl-2-methoxybenzene sulphonic acid, 2,5-dichloro-4-aminobenzene sulphonic acid, further 2,4-diaminobenzene sulphonic acid, 4-methylaminobenzene sulphonic acid, 4-dimethyl-aminobenzene sulphonic acid, 1-aminobenzene-3,5-disulphonic acid, 1-amino-naphthalene-4-sulphonic acid, 2-amino-pyridine-5-sulphonic acid, 5-amino-quinoline-8-sulphonic acid, 4-acetylaminobenzene-sulphonic acid, 4-benzoylamino-benzene-sulphonic acid, 4-nitrobenzene-sulphonic acid, 4-sulpho-amido-2', 4'-diamino-1,1-azobenzene and the like.

The acylamino and nitro-groups have been mentioned already as groups or substituents capable of being converted into amino-groups by customary methods. Additional groups include azo-methine, acid amide, acid-hydracid, nitroso, azo, azoxy, hydrazo and halogen groups, all of which are readily changed to amino groups. From these groups the acylamino and azomethine group may be transformed into the amino group by hydrolysis, the acid-amide and acid-hydracid group by the decomposition method according to Hoffmann or Curtius, whereas the nitro, nitroso, azo, azoxy or hydrazo group are converted by reduction into the amino group. Finally the halogen may be converted into an amino group by treating with ammonia under pressure.

The sulphonic acids or their halides etc. on the one hand, and their amides or their metal compounds respectively on the other hand, are converted according to the present invention with amino sulphones of the general formula

$$NH_2.R'—SO_2—R''$$

or with halogen sulphones of the general formula $Hal.R'—SO_2—R''$. If the sulphonic acids have two or more sulphonic acid groups, then two or more organic sulphone residues may be introduced.

Known amino sulphones of this kind are, for example, methyl-3-aminophenyl sulphone, ethyl-3-aminophenyl-sulphone, butyl-3-aminophenyl-sulphone, β-hydroxyethyl-3 - aminophenyl - sulphone, 4-amino-diphenyl - sulphone, methyl-4-aminophenyl-sulphone, hexyl-4-amino - phenyl-sulphone, methyl - aminoethyl - sulphone, butyl-amino-ethyl-sulphone and the like.

These sulphones are obtained in a known manner by the oxidation of the corresponding sulphides or sulphoxides respectively or by converting the corresponding sulphinic acid salts with compounds containing an easily exchangeable halogen atom, for example, with alkyl halides, arylalkyl halides, α- or o-halogen-carbonic acids and the like.

The sulphones not containing an amino group may be converted by nitration into the corresponding nitro compounds, which are transformed into the amino sulphones by reduction. Those sulphones which contain known water-solubilizing groups, such as, hydroxyl-, ether-, carbonic acid-, sulphonic acid-, sulphuric acid ester, amino groups and the like are particularly interesting. Such compounds as 3-amino-phenyl-sulphone-acetic acid, 3-aminophenyl-(dimethylaminoethyl)-sulphone etc. are illustrative of the sulphones containing water-solubilizing groups. Moreover these amino sulphones may bear on the amino group also a further substituent in the form of any organic residue.

As known sulphones of the general formula Hal.R'—SO₂—R" containing an exchangeable halogen atom and being applicable as initial materials according to the second manner of carrying out the present invention the following compounds are to be named: methyl-chloro-ethyl-sulphone, butyl-chloroethyl-sulphone, benzyl-chloroethyl-sulphone, 1-chloro-2,4-di-(methyl-sulphone)-benzene, 4-bromophenyl-methyl-sulphone and the like. These sulphones are obtainable according to analogous methods as indicated above and they are of a particular technical value if they contain one or more of the above indicated external groups with the property of rendering them water-soluble.

The conversion between the sulphonic acids, sulphonic acid-halides etc. and the amino-sulphones of the general formula NH₂.R'.SO₂.R" is performed in a known manner. For this conversion condensing means may be used if necessary such as acid binding agents and/or catalysts. Furthermore any solvent or diluent may be added to the reaction mixture. The working up of the condensation-products is performed in a usual manner. The conversion between the sulphonic acid amides and the halogen sulphones of the general formula Hal.R'.SO₂.R" is likewise carried out according to known methods in the presence or absence of condensing means, catalysts, diluents etc.

When the amino group is not yet present in the condensation product this group is formed after the condensation from suitable groups according to one of the above indicated methods.

Sulphonamide derivatives, which may be obtained according to the prescribed process are, for example, the 4-aminobenzene-sulphonic acid-(4'-methylsulphone-phenyl)-amide, 4-amino-benzene-1-sulphonic acid-(3'-methyl-sulphone-phenyl)-amide, 4-aminobenzene-1-sulphonic acid-(3'-hydroxyethyl-sulphone-phenyl)-amide and the like.

The present process may likewise be carried out in such a manner that the sulphonic acids or sulphonic acid-halogenides etc. on the one hand, and the sulphonic acid amides on the other hand are not condensed with amino-substituted sulphones of the general formula NH₂.R'.SO₂.R" nor, respectively, with halogen-substituted sulphones of the general formula Hal.R'.SO₂.R", but rather with compounds containing radicals known to be suitable for conversion into the aforesaid compounds. Then the sulphone group is built up in accordance with known methods.

When proceeding in this manner in lieu of the amino or halogen compounds containing sulphone groups other compounds are introduced which contain instead of the sulphone group a group convertible into a sulphone group, for example, a sulphoxy or sulphide group and the thus obtained condensation-products are transformed into the corresponding sulphone compounds, that is, by oxidation. Furthermore the radical of an amino or halogen substituted alkyl-, arylalkyl-, aryl- etc. sulphinic acid salt may be introduced first and then converted into a sulphone. The condensation-product may be converted into a sulphone by reacting it with organic compounds containing an easily exchangeable anion forming substituent. Moreover one condenses the sulphonic acids or the sulphonic acid halides respectively first with an aromatic monoacylated diamino compound, for example, with N-acetyl-phenylene-diamine. After the acetyl group is split off the amino group may be diazotized and may be converted by a treatment with sulphur dioxide, in the presence of copper, into a sulphinic acid group. The alkali salts of the sulphinic acid are then transformed into sulphones in the usual way.

The derivatives of sulphonamides produced according to the present invention, represent easily soluble agents for combating bacteria and other parasites in the human or animal body respectively; they are readily compatible with bodily processes and do not cause any injurious secondary effects.

*Example*

Twenty-three and three-tenths parts by weight of p-acetaminobenzene-sulphochloride are introduced gradually, while stirring, into a benzene solution of 17.1 parts by weight of 3-aminophenyl-methyl-sulphone in the presence of anhydrous sodium acetate. After allowing the solution to stand for a short period of time, the reaction mixture is heated for 4 hours on a water-bath under a reflux condenser. When the conversion is completed the solvent is distilled off and the residue is worked up. Thirty-three and eight-tenths parts by weight of p-acetaminobenzenesulpho-methylsulphonephenylamide are obtained. The reaction product is dissolved in a four- to five-fold amount of a 10% caustic soda and saponified by boiling under a reflux condenser for several hours. When the saponification is finished, the reaction product is worked up. The 1-(4'-aminobenzene-sulphonic acid) amino-phenyl-3-methyl-sulphone of the formula $NH_2.C_6H_4.SO_2.NH.C_6H_4.SO_2.CH_3$ is obtained in the form of a greyish-white crystal powder.

We claim:

1. A 1-(4'-aminobenzene sulphonyl)-aminophenyl-3-alkyl-sulphone.

2. The 1-(4'-aminobenzene sulphonyl)-aminophenyl-3-methyl-sulphone.

3. A process for producing a monosulphonamide having bactericidal properties which comprises condensing para-acetamino benzene-sulphochloride with 3-aminophenyl-methyl-sulphone.

4. A sulphonamide having the formula $NH_2$—Ar—$SO_2$—NH—Ar—$SO_2$—$CH_3$, wherein Ar is a benzene nucleus, the sulphonyl radicals being in a para position with respect to the amino radicals and being joined to the Ar radicals through a carbon atom.

5. A 1-(4'-aminobenzene-sulphonyl)-aminophenyl-alkyl-sulphone selected from the group consisting of the meta alkyl sulphone and the para alkyl sulphone.

WINFRID HENTRICH.
ALFRED KIRSTAHLER.
WILHELM KAISER.